United States Patent [19]

Kok et al.

[11] 3,822,376

[45] July 2, 1974

[54] READING HEAD MOUNTING ARRANGEMENT FOR CARD READER

[75] Inventors: Jurgen Kok, Bedford; John P. McCarthy, Hanover, both of Mass.

[73] Assignee: Dymo Industries, Inc., San Francisco, Calif.

[22] Filed: June 8, 1973

[21] Appl. No.: 368,287

[52] U.S. Cl. .. 235/61.11 R, 179/100.2 CA, 200/46, 340/174.1 M

[51] Int. Cl. .......... G06k 7/01.5

[58] Field of Search.. 200/46; 235/61.11 B, 61.11 J, 235/61.11 D, 61.11 R; 35/35 C; 346/74 M; 179/100.2 TB, 100.2 CA; 340/174.1 R, 174.1 F

[56] References Cited

UNITED STATES PATENTS

| | | | |
|---|---|---|---|
| 2,986,725 | 5/1961 | Dirks | 340/174.1 R |
| 3,144,525 | 8/1964 | Fenn et al. | 200/46 |
| 3,412,483 | 11/1968 | Jacobs | 35/35 C |
| 3,559,999 | 2/1971 | Perkins | 274/4 |
| 3,586,790 | 6/1971 | Guttinger et al. | 179/100.2 |

*Primary Examiner*—Malcolm A. Morrison
*Assistant Examiner*—Vincent J. Sunderdick
*Attorney, Agent, or Firm*—Samuelson & Jacob

[57] ABSTRACT

A card reader in which a data area on a card is scanned by movement of a reading head across a data area, the reading head being carried by a movable carriage and coupled to the carriage by a plurality of parallel, resiliently flexible cantilever members extending between the carriage and the reading head and enabling displacement of the reading head relative to the carriage in a direction normal to the data area to compensate for variations in the spacing between the data area and the fixed path of travel of the carriage while maintaining proper orientation of the reading head relative to the data area without introducing effective changes of reading speed.

9 Claims, 3 Drawing Figures

READING HEAD MOUNTING ARRANGEMENT FOR CARD READER

The present invention relates generally to card readers and pertains, more specifically, to an arrangement for mounting a reading head for optimum performance in reading data from a card placed in a card reader.

Card readers are presently available for detecting or "reading" data encoded upon a card and translating the detected data into electrical information which can be utilized or stored for further processing. For example, the encoded data can be a telephone number and the card reader will translate the data on the card into electrical information which can be utilized by a telephone for automatically "dialing" the telephone number encoded on the card.

Another example, and one which is now coming into widespread use, is the use of card readers for reading a credit card with the card number encoded in a data area on the card. In this instance, the card reader translates the encoded data into electrical information which is passed to a computer for virtually instantaneous credit verification. Data may be encoded within the data area of a card by either optical or magnetic techniques. At present, magnetic encoding has been chosen for use in connection with credit cards.

A particularly effective device for reading the data encoded upon cards, whether optically or magnetically encoded, utilizes a reading head which is moved aross a card held stationary in the device to scan the data read by the card. Such a technique requires proper location and orientation of the reading head relative to the data area for optimum results. Because of variations in the cards placed in the card reader, due to dimensional variations and changes in the cards resulting from handling and general wear and tear, the card reader should incorporate means to compensate for these variations and changes while maintaining the desired proper location and orientation of the reading head relative to the data area. This is particularly true where the data is encoded in a magnetic strip on the card and the strip is read by a magnetic reading head which must make contact with the strip without undue pressure, and concomitant wear, and must be properly oriented relative to the strip during movement of the reading head to detect the data stored therein.

It is therefore an object of the invention to provide a reading head mounting arrangement for a card reader in which the reading head moves across the card to scan data thereon, which arrangement enables optimum performance of the reading head despite variations in card dimensions and condition.

Another object of the invention is to provide a reading head mounting arrangement of the type described in which the reading head is carried by a carriage and is displaceable relative to the carriage in response to variations in the card placed in the card reader to compensate for such variations without degrading the performance of the reading head.

Still another object of the invention is to provide a reading head mounting arrangement of the type described which enables the carriage to be accurately located relative to the card by a relatively rigid structure which provides accurate advancement of the carriage and the reading head for accurate reading of the data on the card while compensating for variations in the card.

A further object of the invention is to provide a reading head mounting arrangement which enables optimum pressure to be maintained between the reading head and a magnetic strip on the card despite variations in the card due to dimensional differences and wear and tear on the card.

A still further object of the invention is to provide a reading head mounting arrangement of the type described which is reliable yet simple in construction and is readily fabricated of inexpensive materials.

The above objects, as well as still further objects and advantages, are attained by the invention which may be described briefly as providing, in a card reader in which a data area located upon a card is scanned by movement of a reading head across the data area, a reading head mounting arrangement comprising a carriage movable along a fixed path of travel generally parallel to the data area, a plurality of elongate members projecting from the carriage parallel to the data area and spaced therefrom, each member having one end affixed to the carriage and an opposite end remote from the carriage, each member being located at the apex of a polygon lying in a plane generally perpendicular to the data area and being movable about the one end in the direction perpendicular to the data area and parallel to the plane, and means coupling the reading head to the members at the opposite ends thereof such that the reading head is in proper orientation relative to the data area for scanning the data area and is displaceable relative to the carriage in the direction of movement of the members by movement of the members in that direction while being confined to the proper orientation during such displacement. The above construction also enables scanning of the data area in either direction, thus making it possible to avoid undue delay associated with the return to a starting position.

The invention will be more fully understood, while still further objects and advantages will become apparent, in the following detailed description of an embodiment of the invention illustrated in the accompanying drawing, in which.

Figure 1:
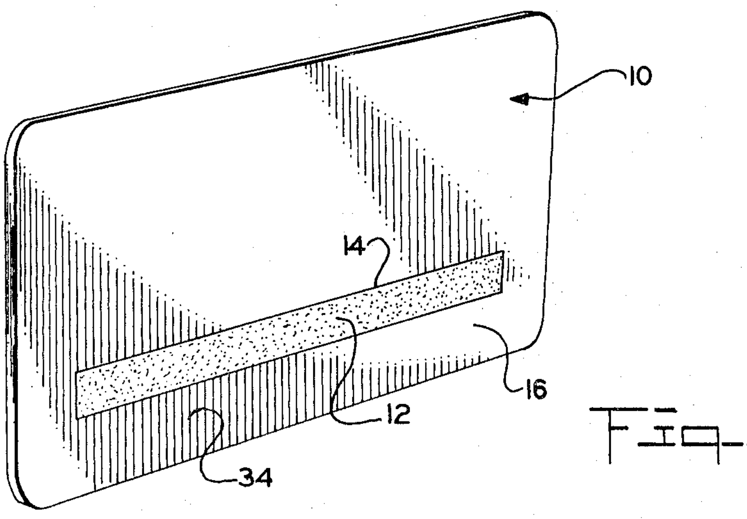
FIG. 1 is a perspective view of a card showing a magnetic strip for carrying magnetically encoded data.

Referring to the drawing, and especially to FIG. 1 thereof, a card is illustrated generally at 10, card 10 having the general configuration of an ordinary credit card or the like. Card 10 is provided with a data area 12 wherein data pertaining to the card is encoded upon the card. In this instance, the data is encoded magnetically upon a magnetic strip 14 which is integral with the face 16 of the card 10. Cards bearing magnetically encoded material are well known, and systems for reading such cards are presently available. One such system is illustrated in U.S. Pat. No. 3,617,638.

Figure 2:
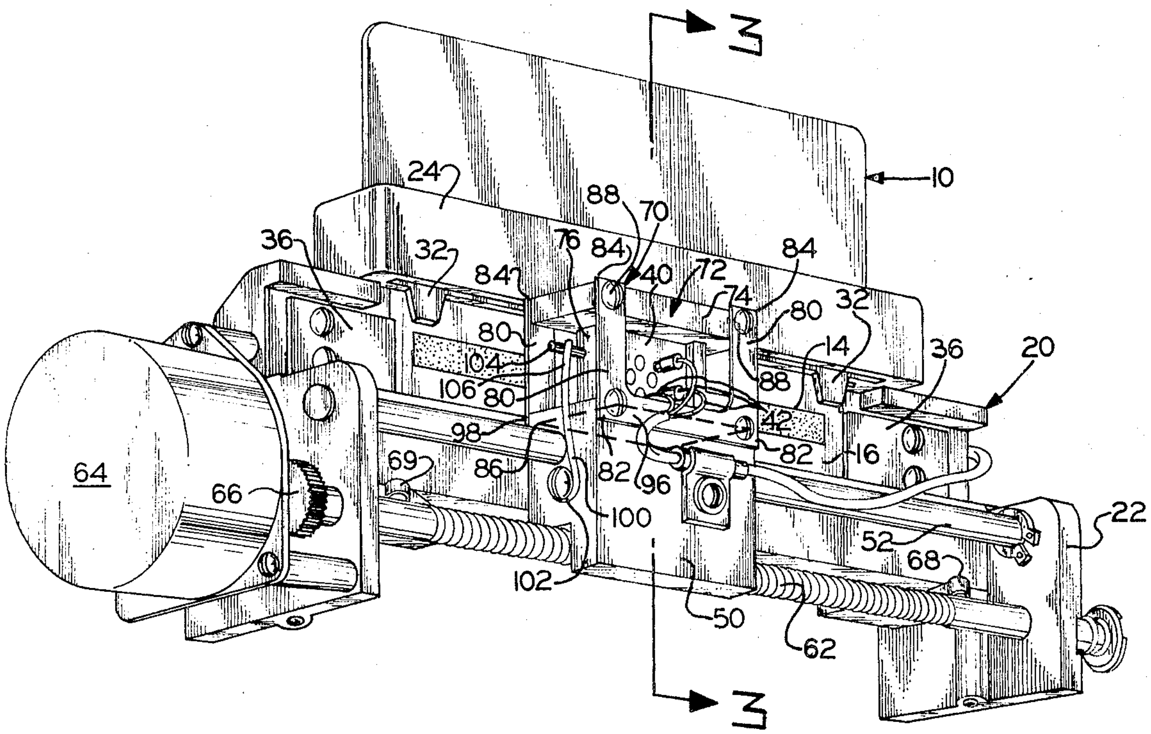
FIG. 2 is a pictorial view of a card reader reading the data encoded upon the card of FIG. 1 and illustrating a reading head mounting arrangemnet constructed in accordance with the invention.
Figure 3:
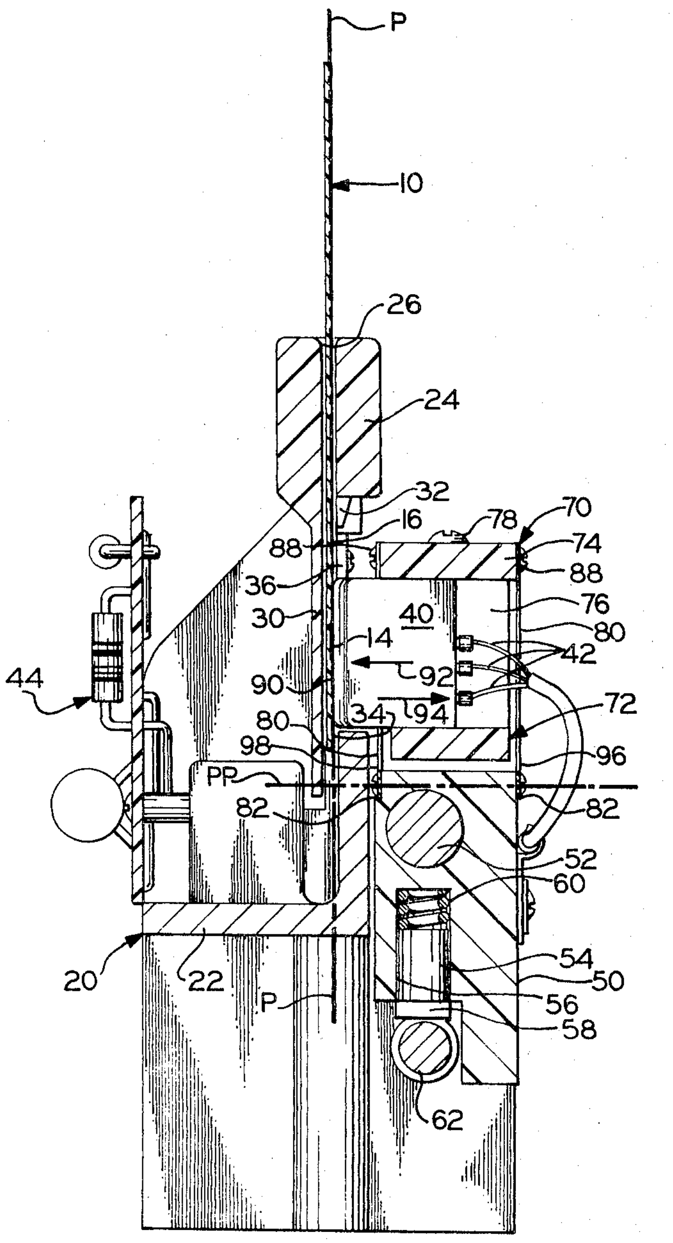
FIG. 3 is a transverse cross-sectional view taken along line 3—3 of FIG. 2.

Turning now to FIGS. 2 and 3, the internal mechanism of a card reader is illustrated generally at 20 and is shown reading the data encoded upon magnetic strip 14 of the card 10. The card reader mechanism 20 includes a frame 22 which carries a card holder 24 having a slot 26 within which the card 10 is received. A back plate 30 and a pair of front tabs 32 aid in retaining the card within the card holder while at the same time locating the lower portion 34 of face 16 of the card nominally in a vertical plane P. A pair of resilient side tabs 36 are affixed to the frame 22 below the front tabs 32 and further aid in locating face 16 of card 10 in the plane P.

The data which is encoded in the magnetic strip 14 located upon the data area 12 of the card 10 is detected, or read, by a magnetic reading head 40 which lightly engages the magnetic strip 14 and traverses the strip from left to right, as viewed in FIG. 2. The data area 12 may also be read by the reading head 40 as the strip 14 is traversed by movement of the head 40 from right to left. As the reading head 40 traverses the magnetic strip 14 the data encoded in the strip is scanned and converted into electrical information which is passed, via conductors 42, to an electronic circuit 44 which serves as an interface for processing the electrical information received from the reading head 40 and providing an output suitable for use by a further device such as a computer.

The reading head 40 is carried by a carriage 50 which is mounted for sliding movement upon a slide rod 52 affixed to the frame 22 of the card reader mechanism 20. A drive pin 54 (see FIG. 3) is received within a bore 56 in the carriage 50 and terminates in a tooth 58 which is urged resiliently downwardly by a spring 60 to engage a lead screw 62 journaled for rotation in the frame 22 of the card reader mechanism. An electric motor 64 is mounted upon the frame 22 and is coupled with the lead screw 62 through a gear train 66 so that upon actuation of the motor 64 the lead screw 62 will be rotated and the carriage 50 will be advanced along the slide rod 52 to carry the reading head 40 through the desired scanning movement. The slide rod 52 is parallel to plane P so that the carriage 50 follows a fixed path of travel which is parallel to the plane P. The carriage 50 will traverse the slide rod 52 from left to right, or from right to left, as viewed in FIG. 2, as the data is scanned. Upon completion of the traversing movement from left to right, the carriage 50 will engage a first limit switch 68 which, upon actuation, may stop or reverse the direction of rotation of the motor 64. Upon completion of the traversing movement from right to left, the carriage 50 will engage a second limit switch 69 which will be actuated to either stop or reverse the motor 64.

In order to obtain optimum results in reading the encoded data, the reading head 40 should contact the magnetic strip 14. Such contact should be limited to only light pressure so as to minimize wear upon the magnetic strip, as well as upon the reading head itself. Since the card reader mechanism 20 must be capable of handling a multitude of cards during its lifetime, and since such cards are subjected to a great deal of handling which tends to distort the cards from their original dimensions, which themselves are subject to various manufacturing tolerances, card reader mechanism 20 is provided with a reading head mounting arrangement 70 which will enable the reading head 40 to be displaced in response to variations in the card 10 which cause the face 16 of the card at the data area 12 to depart from the nominal location in plane P.

Thus, the reading head 40 is secured within a carrier 72 which includes an uppermost cap 74 and a U-shaped bracket 76 affixed to the cap 74 by threaded fasteners 78 for securing the reading head 40 between the cap 74 and the bracket 76. A plurality of elongate members illustrated in the form of four resiliently flexible leaf spring members 80 are affixed at one end 82 thereof in cantilever fashion to the carriage 50 and extend upwardly parallel to one another, and generally parallel to plane P, to remote upper ends 84. The lower end 82 of each leaf spring member 80 is located at a different vertex of a polygon, illustrated in the form of rectangule 86, which lies in a plane PP parallel to the fixed path of travel of the carriage 50 and perpendicular to plane P, the leaf spring members 80 being normal to plane PP. The carrier 72 is suspended from the upper ends 84 of the leaf spring members 80 and is affixed thereto by threaded fasteners 88.

In the normal position of the reading head 40, as illustrated in FIG. 3, the front face 90 of the reading head 40 is parallel to plane P and is juxtaposed therewith so as to be in position to read the data encoded upon the strip 14 of a card 10 whose face 16 is located in plane P. The resilient flexibility of the leaf spring members 80 will permit forward and backward displacement of the reading head 40, as indicated by arrows 92 and 94, respectively, toward and away from plane P, but will confine such movement only to that in which the orientation of the front face 90 of the reading head 40 remains parallel to plane P. Thus, the critical parallel relationship between the front face 90 of the reading head 40 and the plane P will be retained, despite variations in the card 10 which may displace the reading head 40 from the nominal location illustrated in FIG. 3 as the reading head traverses strip 14. The construction and assembly of the mounting arrangement 70 is facilitated by fabricating the rear pair of leaf spring members 80 as a part of a single U-shaped unit 96 while the front pair of leaf spring members 80 are likewise a part of a single U-shaped unit 98.

In order to provide a light pressure between the reading head 40 and the strip 14 of card 10 and to enable the reading head to follow variations in the card, means are provided for resiliently biasing the reading head 40 toward the face 16 of card 10 and are illustrated in the form of springs 100 (only one of which is illustrated in FIG. 2) located at each side of the reading head. Each spring 100 is affixed at one end 102 thereof to the carriage 50 and engages a pin 104 carried by the carrier 72 adjacent the other end 106 of the spring 100. The spring 100 resiliently biases the carrier 72 and the reading head 40 in a forward direction to establish the desired light pressure between the face 90 of the reading head and the face 16 of the card.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. In a card reader in which a data area located upon a card is scanned by movement of a reading head across the data area, a reading head mounting arrangement comprising:

a carriage movable along a fixed path of travel generally parallel to the data area;

a plurality of elongate members projecting from the carriage parallel to the data area and spaced therefrom, each member having one end affixed to the carriage and an opposite end remote from the carriage, each member being located at a different vertex of a polygon lying in a plane generally perpendicular to the data area and being movable about said one end in the direction perpendicular to the data area and parallel to said plane; and means coupling the reading head to said members at the opposite ends thereof such that the reading head is in proper orientation relative to the data area for scanning the data area and is displaceable relative to the carriage in said direction by movement of said members in said direction while being confined to said proper orientation during such displacement.

2. The invention of claim 1 including means resiliently biasing the reading head toward the data area.

3. The invention of claim 1 wherein:

said data area lies nominally in a plane;

the path of travel of the carriage is parallel to the plane of the data area;

the members extend parallel to one another; and the direction of displacement of the reading head is perpendicular to the path of travel of the carriage.

4. The invention of claim 3 wherein each member is a resiliently flexible cantilever with the one end thereof secured to the carriage and the opposite end thereof free to move in the direction perpendicular to the data area and parallel to the plane of said polygon.

5. The invention of claim 4 including means resiliently biasing the reading head toward the data area.

6. The invention of claim 5 wherein said biasing means include at least one spring between the carriage and the reading head for urging the reading head relative to the carriage toward the data area.

7. The invention of claim 4 including four of said members, each located at a different vertex of a rectangle.

8. The invention of claim 7 including means resiliently biasing the reading head toward the data area.

9. The invention of claim 8 wherein said biasing means include at least one spring between the carriage and the reading head for urging the reading head relative to the carriage toward the data area.

* * * * *